United States Patent Office 3,639,313
Patented Feb. 1, 1972

3,639,313
MODIFIED POLYAMIDE RESINS
Arnold H. Gruben, Cedar Grove, and Daniel J. Carlick, Berkeley Heights, N.J., assignors to Sun Chemical Corporation, New York, N.Y.
No Drawing. Filed Nov. 26, 1969, Ser. No. 880,435
Int. Cl. C08g 20/20
U.S. Cl. 260—18 N        9 Claims

ABSTRACT OF THE DISCLOSURE

A modified polyamide resin particularly suitable for use in printing inks and laminating inks comprises a polyamide resin which is the reaction product of at least one polymeric fatty acid and at least one diamine or polyamine and up to about 40 weight percent of a cyclic lactam, such as e-caprolactam.

This invention relates to novel polyamides. More specifically it relates to novel modified polyamides and particularly to polyamides modified with a cyclic lactam.

Low molecular weight polyamide resins are important raw materials in printing inks, heat-seal lacquers, and hot melt adhesives, and the need for these resins has increased concomitantly with the growth of the packaging industry. Along with the growth of the packaging industry, however, have come problems for the flexographic ink industry, primarily as a result of the many varieties of flexible films used in packaging and of the chemical and physical treatments imparted to these flexible films. Printing inks, heat-seal lacquers, and laminating inks suitable for cellophane films are no longer applicable to, for example, the polyester, vinyl, and hydrocarbon films which to a large extent have replaced cellophane. This has necessitated new formulations which ideally possess all of the properties desired for each type of film material, such as gloss, adhesion, blocking resistance, flexibility, pigment wetting, solubility in alcohols, good running characteristics on a press, freedom from odor, and so forth.

In accordance with this invention polyamides have been found which may be formulated into inks, coatings, adhesives, and the like, having all of the necessary and desired properties set forth above.

In brief, the modified polyamides of this invention are copolymers of (a) a polyamide generally derived from polymeric higher fatty acids and (b) a cyclic lactam, e.g., e-caprolactam or dodecalactam.

In general, the starting polyamides are those derived from polymeric higher fatty acids, such as those disclosed in U.S. Pats. 2,379,413 and 2,450,940, and more specifically those polyamides which are products of the reaction of at least one polymeric fatty acid with at least one diamine or polyamine. Although not limited thereto, the polymeric higher fatty acid may be at least one dimer and/or trimer of a fatty acid having about 6 to 26, and preferably about 15 to 18, carbon atoms per molecule, e.g., polycarboxylic acids prepared from linseed, soybean, cottonseed, oiticica, tall, sunflower, safflower, peanut, wheat, corn, tung, dehydrated castor, perilla, conjugated linseed, and other drying and semi-drying oils.

The amine may be at least one diamine or polyamine having the formula $H_2N(RNH)_xH$, where R is an alkylene radical having 1 to 8, and preferable 2 to 6, carbon atoms per molecule, and $x$ is an integer of 1 to 6. Examples include ethylene diamine, trimethylene diamine, tetramethylene diamine, pentamethylene diamine, hexamethylene diamine, diethylene triamine, triethylene tetramine, tetramethylene pentamine, diacetone diamine, 1,3-diaminobutane, 1,4 - diaminobutane, 3 - (N-isopropylamino)propylamine, 3,3¹-iminobispropylamine, and the like, and mixtures thereof. Preferably, but not necessarily, in order to obtain a polyamide having the desired low acid and amine values the ratio by equivalents of acid to amine is approximately 1:1.

In addition to the above, the reactants may include one or more other compounds such as a monobasic acid, e.g., formic, acetic, propionic, butyric, hexanoic, isooctanoic, glycolic, lactic, B-hydroxypropionic, α-hydroxy-n-caproic, salicylic, phenylglycolic, phenyllactic, and monomeric fatty acids; an additional polybasic acid, e.g., glutaric, adipic, pimelic, suberic, azelaic, maleic, benzoic, itaconic, phthalic, hydrophthalic, and terephthalic acids, and esters and anhydrides thereof; dimerized rosin acids; and so forth.

Such polyamides are exemplified by, but not limited to, those of the type sold by Sun Chemical Corporation as Sunken polyamide resins; by General Mills, Inc., as Versamid polyamide resins (polyamide resins obtained by the condensation of dimers or trimers of an unsaturated fatty acid containing at least 10 carbon atoms with a stoichiometric quantity of a diamine or a triamine); by Emery Industries, Inc., as Emerez polyamide resins (polyamide resins derived from the reaction of Emery dimer acids with linear diamines); and by Lawter Chemicals, Inc.

The copolymers may be prepared in any convenient manner; for example the lactam may be coreacted with the fatty acid(s) and amine(s), or alternatively it may be post-added to the polyamide resin.

The cyclic lactam may comprise up to about 40, and preferably about 5 to 20, percent by weight of the copolymer composition. The process of the invention may be carried out at a temperature of about 150° to 300°, and preferably about 150 to 250° C. for a period of time ranging from about 30 minutes to 10 hours, preferably under agitation in an inert atmosphere, e.g., carbon dioxide, nitrogen, argon, helium or the like.

Although the exact mechanism of copolymerization of e-caprolactam with the polyamide is not now completely understood, it is believed that the polymerization proceeds either with the initiation by water, leading to the formation of some e-amino caproic acid

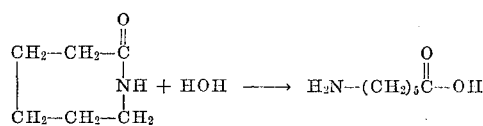

which in turn acts as an accelerator for the polymerization of the e-caprolactam to a low molecular weight polymer

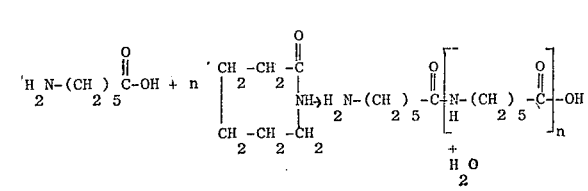

which thereafter co-condenses with the polyamide condensate, e.g., poly(ethylene-dilinoleic amide), to form the final reaction product, or by direct co-reaction with the dilinoleic-ethylene diamine salt to form the final polymer. It is also conceivable that both of these reaction mechanisms occur simultaneously.

The resulting copolymers are much tougher and more flexible than the corresponding unmodified polyamide, making them particularly useful for formulation into flexographic inks, hot melt adhesives, and heat-seal lacquers.

The inks, coatings, or adhesives prepared from the polyamides of this invention generally comprises the motified polyamide and a solvent in the presence or absence of a colorant and/or other conventioinal additives.

Any suitable solvent may be employed, such as for example, alcohols, preferably those having 1 to 4 carbon atoms, e.g., methanol, ethanol, propanol, and butanol; aliphatic and aromatic saturated and unsaturated hydrocarbons and halogenated derivatives thereof, e.g., kerosene, naphtha, benzene, xylene, toluene, hexane, cyclohexane, heptane, octane, isooctane, nonane, decane, fluorochloroalkanes, trichloroethylene, tetrachloroethylene, dichloroethane, carbon tetrachloride, and the like; low-boiling esters, e.g., ethyl acetate, propyl acetate, isopropyl acetate, and butyl acetate; glycols and derivatives thereof, e.g., diethylene glycol; dipropylene glycol, 2-methyl-2,4-pentanediol, Cellosolve (glycol monoethyl ether), Cellosolve acetate, Carbitol (diethylene glycol monoethyl ether), Carbitol acetate, butyl-Carbitol acetate; oxygenated solvents, e.g., dioxane; and the like; and mixtures thereof. The amount of solvent in a printing ink composition may range from about 25 to about 80 weight percent, and preferably about 35 to 45 weight percent, of the total composition. In a laminating ink formulation the amount of solvent may range from about 40 to 60, and preferably about 45 to 55, weight percent, based on the weight of the total composition. The modified resin may be used in an amount ranging from about 15 to 25, preferably about 18 to 22 percent of the weight of a printing ink, and a colorant from about 5 to 50, preferably about 35 to 45 percent of the weight of a printing ink. In a laminating ink, the amount of modified polyamide may range from about 5 to 20, preferably about 8 to 15, percent by weight, and the amount of colorant may range from about 5 to 50, preferably about 25 to 35, percent by weight of the total composition.

It is to be understood that conventional colorants, either pigments or dyes, may be used in conventional quantities in the ink formulations of this invention. Suitable dyes include methylene blue, aniline dyes, alizarine red, auramin naphthol, malachite green, and the like. Suitable pigments include carbon black, zinc oxide, titanium dioxide, phthalocyanine blue, phthalocyanine green, benzidine yellow, hansa yellow, naphthol yellow lake, cadmium orange, chrome yellow, Prussian blue, bronze blue, chrome green, peacock blue lake, monastral blue, red lake C, para red, toluidine red, barium lake red C, sodium lithol red, barium lithol red, lithol rubine, molybdated scarlet chrome, ferric oxide, aluminum hydrate, and the like.

Other commonly known modifiers can be incorporated into these formulations; these include hardeners; stabilizers; plasticizers; wetting agents for the colorant, such as triethanolamine; leveling agents, such as lanolin, paraffin waxes, and natural waxes such as cerise wax and carnauba wax; and the like. Such modifiers are generally used in amounts ranging from 0 to about 5 percent by weight, preferably about 2 to 3 percent, based on the weight of the resin.

Drying oil binders such as soybean oil; linseed oil; tung oil; oiticia oil; tall oil; oil-modified alkyd, phenolic, and maleic resins; and the like may also be included in the present formulations in amounts ranging from about 5 to about 60, preferably about 10 to 30 percent, based on the weight of the wet composition.

The ink and adhesive formulations of this invention may be prepared in any convenient manner, for example, in a three-roll mill, a sand mill, a ball mill, a colloid mill, or the like, in accordance with known techniques.

This invention is further illustrated by the following examples. It is to be understood, however, that these examples are given solely for the purpose of illustration and that the invention is not to be regarded as being limited to any of the specific materials or conditions recited therein except as set forth in the appended claims. Unless otherwise specified, all parts are given by weight.

EXAMPLE 1

(A) A reactor was purged with nitrogen and then charged with 630 parts (0.72 equivalent) of Empol 1018 (Emery Industries' mixture of 83 weight percent of dilinoleic acid and 17 weight percent of trilinoleic acid), 77.7 parts (0.18 equivalent) of isooctanoic acid, 23.1 parts (0.10 equivalent) of hexahydrophthalic anhydride, and 43.2 parts (5 weight percent) of e-caprolactam. The reactants were mixed and heated in an enclosed reactor provided with a trap for collecting water to a temperature of between 100 and 140° C. for an hour under nitrogen. About 90.0 parts (0.98 equivalent) of ethylene diamine were added dropwise to the reactor over a period of ½ to 3 hours while maintaining the temperature between 100 and 140° C. After the addition of the ethylene diamine had been completed, the temperature was raised to about 200° C., and water of condensation was removed through the trap. When about 80–85 percent of the theoretical water was distilled off, the acid and amine values of the reaction mass were determined and adjusted to between 0.75 and 0.85 by the addition of either ethylene diamine or Empol 1018. The reaction mass was held at 200° C. until an acid value of about 10 was obtained. A vacuum was then applied to the reaction mass and held until the reactor contents cooled to 190° C. in an inert atmosphere.

The resulting modified polyamide had an acid value of 6.5, an amine value of 12.1, and a Durran's melting point of 83° C.

(B) The product of part (A) was formulated into a printing ink as follows: A mixture of 20 parts of the modified polyamide; 40 parts of titanium dioxide; and 40 parts of a solvent mixture consisting of 50 percent of ethanol, 25 percent of ethyl acetate, and 25 percent of naphtha was dispersed in a ball mill jar using suitable grinding media.

The resulting ink was tested by gravure-coating onto treated (corona discharge) polyethylene. The film dried to evaporate the solvents. It adhered well to the substrate; it had good printability, gloss, color development, and flow leveling; excellent flexibility; and excellent cold-water crinkle resistance.

(C) The product of part (A) was formulated into a laminating ink as follows: A mixture of 10 parts of the modified polyamide; 5 parts of nitrocellulose (as a hardener); 5 parts of dioctyl phthalate (as a plasticizer); 30 parts of titanium dioxide; and 50 parts of a mixture of 40 percent of ethanol, 20 percent of isopropanol, and 40 percent of naphtha (as solvent) was mixed on a three-roll mill.

The resulting material was used to adhere two layers of cellophane coated with polyvinylidene dichloride at a laminating temperature of about 275° C. by means of a low-pressure heat sealing device. A tight bond was effected between the two films.

For comparative purposes the procedure of part (C) was repeated except that the composition contained a conventional vinyl chloride/vinyl acetate copolymer instead of the modified polyamide of this invention. The bond between the two substrates was weak.

EXAMPLE 2

(A) The procedure of Example 1 was repeated except that the starting materials were 292 parts (1 equivalent)

of Empol 1018, 30.6 parts (1 equivalent) of ethylene diamine, and 80.7 parts (20 weight percent) of e-caprolactam.

The resulting copolymer had an acid value of 7.7, an amine value of 4.8, and a Durran's melting point of 110° C.

(B) The product of part (A) was formulated into a printing ink and into an adhesive as in Example 1 (parts B and C). The results were comparable.

EXAMPLE 3

The procedure of Example 1 was repeated except that the starting materials were 0.8 equivalent of Empol 1018, 0.2 equivalent of hexahydrophthalic anhydride, 0.95 equivalent of ethylene diamine, and 10 weight percent of e-caprolactam. The results were comparable.

EXAMPLE 4

A number of runs were made using a variety of starting materials. The results are tabulated below:

TABLE

| e-Caprolactam, percent in copolymer | Reactants | | | | Properties of the modified polyamide | | |
|---|---|---|---|---|---|---|---|
| | | Chemical equivalents of— | | | Melting point, °C. (Durran) | Acid value | Amine value |
| | Ethylene diamine | Empol 1018 | Monoacid | HHPA | | | |
| 0 | 0.98 | 0.72 | 0.18 (I) | 0.1 | 97 | 3.0 | 5.0 |
| 10 | 0.98 | 0.72 | 0.18 (I) | 0.1 | 83 | 7.8 | 10.8 |
| 10 | 0.98 | 0.72 | 0.18 (P) | 0.1 | 100 | 2.5 | 9.7 |
| 5 | 0.98 | 0.80 | 0.10 (I) | 0.1 | 87 | 5.1 | 10.5 |
| 11.4 | 1.00 | 0.82 | 0.20 (P) | 0 | 102 | 4.9 | 3.6 |
| 11.4 | 1.00 | 0.82 | 0.20 (I) | 0 | 105 | 6.5 | 2.5 |
| 11.4 | 1.00 | 0.82 | 0.20 (PL) | 0 | 100 | 7.7 | 2.0 |
| 9.0 | 1.00 | 0.864 | 0 | 0 | 94 | 0.9 | 20.2 |
| 10.0 | 1.00 | 0.864 | 0 | 0 | 94 | 1.0 | 19.5 |
| 11.4 | 1.00 | 0.92 | 0.10 (P) | 0 | 101 | 5.4 | 1.8 |
| 11.4 | 1.00 | 0.81 | 0.10 (P) | 0.07 (AZ) | 117 | 7.4 | 2.5 |
| 11.4 | 1.00 | ¹0.82 | 0.20 (P) | 0 | 102 | 4.9 | 3.6 |

¹ Empol 1014—Emery Industries' mixture of 95 weight percent of dilinoleic acid, 4 percent of trilinoleic acid, and about 1 percent of monomeric linoleic acid.

NOTE.—I—Isooctanoic acid; P—pelargonic acid; PL—palmitic acid; HHPA—hexahydrophthalic anhydride; AZ—azelaic acid.

EXAMPLE 5

(A) To 90 parts of Sunkem 526 (Sun Chemical Corporation's polyamide resin disclosed in U.S. Pat. 3,383,391) was added 10 parts of e-caprolactam in a 4-neck resin reaction flask equipped with trap, condenser, inert gas inlet, and stirrer. The mixture was heated with agitation in an inert atmosphere at a starting temperature of 100° C., increasing over a period of 2 hours to 225° C. The reactor contents were cooled to 190° C., and the copolymer reaction product was recovered.

The resulting modified polyamide resin had an acid number of 5, an amine value of 7, and a Durran's melting point of 95° C.

(B) The product of part (A) was formulated into a printing ink and into a laminating ink by the procedure of Example 1 (parts B and C). The results were comparable.

EXAMPLE 6

The procedure of Example 5 (parts A and B) was repeated with each of the following polyamides instead of Sunkem 526: Sunkem 526G (Sun Chemical Corporation's polyamide resin disclosed in U.S. Pat. 3,383,391); General Mill's Versamids 100, 930, and 940 (polyamides resins obtained by the condensation of dimers or trimers of an unsaturated fatty acid containing at least 10 carbon atoms with at least a stoichiometric quantity of a diamine or triamine); and Emery Industries' Emerez 1530, 1537, 1538, and 1540 (polyamide resins derived from the reaction of Emery dimer acids with linear diamines). The results were comparable.

What is claimed is:
1. A copolymer consisting essentially of the product obtained by reacting (a) at least about 60 weight percent of a polymeric resin which is the reaction product of at least one polymeric fatty acid and at least one diamine or polyamine having the formula $H_2N(RNH)_xH$ wherein R is an alkylene radical having 1 to 8 carbon atoms per molecule and $x$ is an integer of 1 to 6, the ratio of equivalents of acid to amine being about 1:1 and (b) up to about 40 weight percent of e-caprolactam or dodecalactam at a temperature of about 150 to 300° C. for about ½ to 10 hours to copolymerize the reactants.

2. The copolymer of claim 1 wherein (b) is about 5 to 20 weight percent of e-caprolactam.

3. The copolymer of claim 1 wherein the polyamide resin (a) is the product of the reaction of a mixture of 83–95 percent of dimers and about 4–17 percent of trimers of linoleic acid with ethylene diamine.

4. A printing ink which comprises about 15 to 25 weight percent of the modified polyamide resin copolymer of claim 1, about 25 to 80 weight percent of a solvent, and about 5 to 50 weight percent of a colorant, based on the weight of the total ink composition.

5. An adhesive which comprises about 5 to 20 weight percent of the modified polyamide resin copolymer of claim 1, about 40 to 60 weight percent of a solvent, and about 5 to 50 weight percent of a colorant, based on the weight of the total adhesive composition.

6. A process for producing a modified polyamide resin which comprises heating a mixture of (a) at least about 60 weight percent of at least one polymeric fatty acid and at least one diamine or polyamine having the formula $H_2N(RNH)_xH$ wherein R is an alkylene radical having 1 to 8 carbon atoms per molecule and $x$ is an integer of 1 to 6, the ratio of equivalents of acid to amine being about 1:1, and (b) up to about 40 weight percent of e-caprolactam or dodecalactam at a temperature of about 150 to 300° C. for about ½ to 10 hours to copolymerize the reactants.

7. The process of claim 6 wherein the polymeric fatty acid is a mixture of about 83–95 percent of dimers and about 4–17 percent of trimers of linoleic acid, the amine is ethylene diamine, and the cyclic lactam is e-caprolactam.

8. The process of claim 6 wherein the amount of the cyclic lactam in the total composition is about 5 to 20 weight percent.

9. A process for producing a modified polyamide resin which comprises adding to the reaction product of at least one polymeric fatty acid and at least one diamine or polyamine having the formula $H_2N(RNH)_xH$ wherein R is an alkylene radical having 1 to 8 carbon atoms per molecule and $x$ is an integer of 1 to 6, the ratio of equivalents of acid to amine being about 1:1, up to about 40 percent, based on the weight of the total composition, of e-caprolactam or dodecalactam and heating the resulting mixture at about 150 to 300° C. for about ½ to 10 hours.

References Cited

UNITED STATES PATENTS

| | | | |
|---|---|---|---|
| 2,450,940 | 10/1948 | Cowan et al. | 260—404.5 |
| 3,240,732 | 3/1966 | Ham et al. | 260—18 N |
| 3,322,731 | 5/1967 | Cook et al. | 260—78 |
| 3,383,391 | 5/1968 | Carlick et al. | 260—404.5 |
| 3,398,164 | 8/1968 | Rogier | 260—18 |

DONALD E. CZAJA, Primary Examiner

E. R. RZUCIDLO, Assistant Examiner

U.S. Cl. X.R.

106—27; 161—190; 260—24, 31.2 N, 33.2 R, 33.4 R, 33.6 R, 33.8 R, 37 N